United States Patent [19]

Fenemore et al.

[11] Patent Number: 4,795,606
[45] Date of Patent: Jan. 3, 1989

[54] INSPECTION SYSTEMS

[75] Inventors: Peter Fenemore, Preston; Reginald L. Boak, Warrington, both of England

[73] Assignee: National Nuclear Corporation Limited Booths Hall, Knutsford, England

[21] Appl. No.: 823,087

[22] Filed: Jan. 27, 1986

[30] Foreign Application Priority Data

Feb. 7, 1985 [GB] United Kingdom ............... 8503148

[51] Int. Cl.$^4$ ............................................. G21C 17/00
[52] U.S. Cl. .................................... 376/248; 376/249; 414/146; 73/636
[58] Field of Search ............... 376/248, 249; 414/146; 901/44; 73/636

[56] References Cited

U.S. PATENT DOCUMENTS

| | | | |
|---|---|---|---|
| 3,511,091 | 5/1970 | Thome | 376/249 |
| 4,286,287 | 8/1981 | Williams | 376/248 |
| 4,336,104 | 6/1982 | Figlhuber et al. | 376/249 |
| 4,375,165 | 3/1983 | de Sterke | 901/44 |
| 4,385,523 | 5/1983 | Gugel et al. | 376/249 |
| 4,416,846 | 11/1983 | Kastl et al. | 376/249 |
| 4,501,716 | 2/1985 | Engding | 376/249 |
| 4,518,560 | 5/1985 | Takaku et al. | 376/249 |

FOREIGN PATENT DOCUMENTS

| | | | |
|---|---|---|---|
| 2107152 | 4/1983 | United Kingdom | 376/248 |
| 2111795 | 7/1983 | United Kingdom | 376/249 |

Primary Examiner—Salvatore Cangialosi

[57] ABSTRACT

An inspection system for detecting leakage from for example the primary vessel (11) of a nuclear reactor includes a camera (29) carried by an umbilical cable (28) which can be fed through a duct assembly (22) comprising a series of tubular sections (23) connected endwise by flexible bellow (24). A guide track (18) extends around the top of the vessel (11) and each duct section (23) is provided with wheels (25) which engage the track (18). A curved guide tube (17) feeds the duct sections (23) from a vertical entry position (15) in the roof (13) into a horizontal track-engaging disposition. The track (18) includes spaced flanges (20b, 21b) through which the umbilical cable can extend and depend downwardly into the annular space between the primary vessel (11) and a surrounding guard vessel (12).

10 Claims, 1 Drawing Sheet

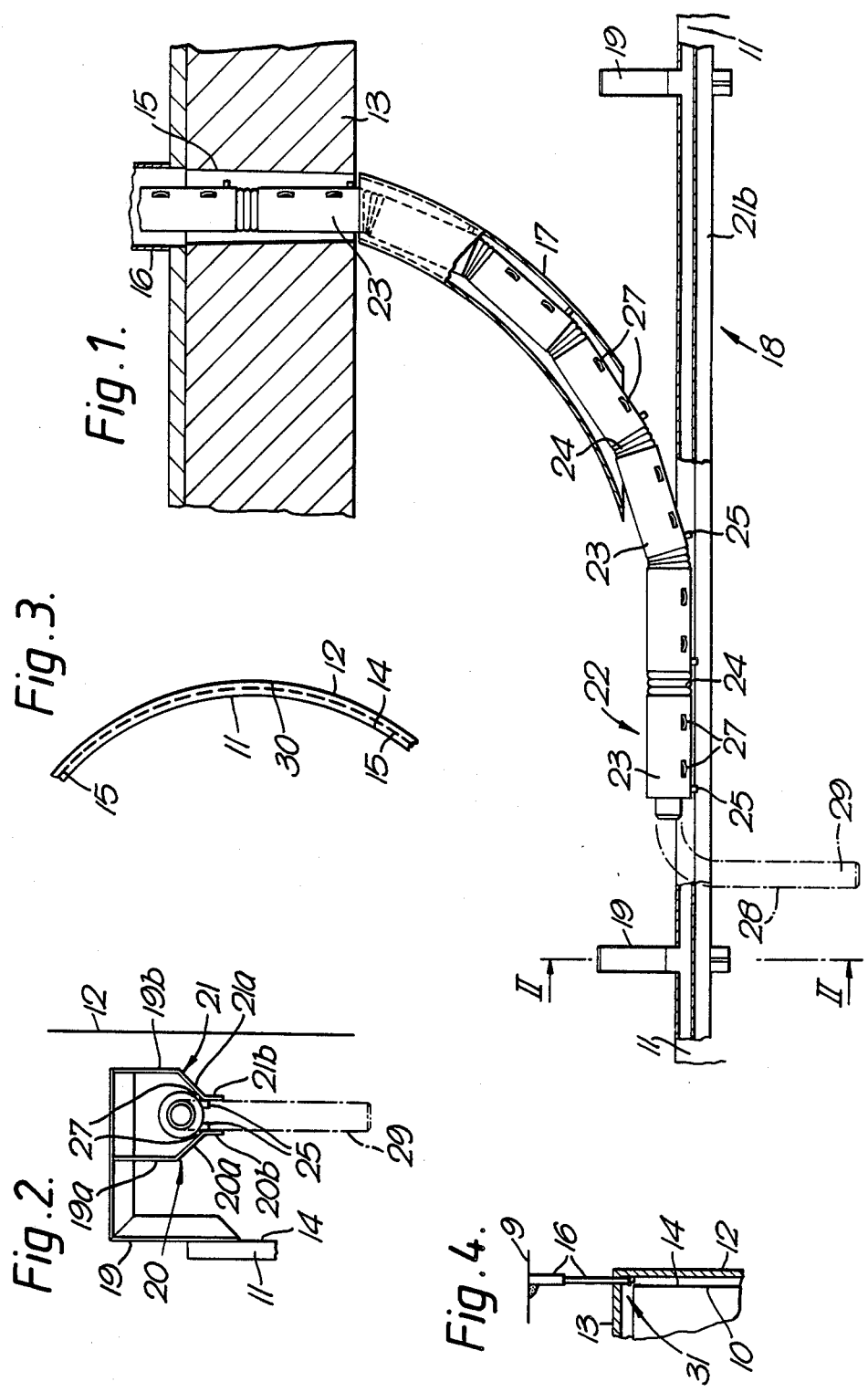

INSPECTION SYSTEMS

BACKGROUND OF THE INVENTION

This invention relates to inspection systems, particularly for nuclear reactor installations.

FEATURES AND ASPECTS OF THE INVENTION

According to this invention, there is provided apparatus for inspecting the surface of a structure comprising a track extending around an upper region of the structure, an elongated flexible carrier engageable along its length with the track and movable lengthwise along the track, means for leading the flexible carrier insertably into engagement with the track, and retractably out of engagement with the track, at at least one position along the length of the track, and inspection means carried by the carrier for selective downward extension and upward retraction relative to the carrier and relative to the track.

The structure may for example be a tube or vessel. The vessel may be closed or open topped.

Also in accordance with the invention, the aforesaid apparatus is provided in combination as part of a nuclear reactor installation including a primary vessel surrounded externally by a guard vessel and defining an annular space therebetween, the track extending around the top of the primary and guard vessels, and the inspection means being extendable into and retractable from the annular space.

The flexible carrier may comprise a series of tubular members, adjacent members being connected for relative movement. The adjacent members may for example be connected by flexible bellows.

The inspection means may comprise a camera carried at an end of a cable extending through the flexible device.

The track may comprise spaced elements defining a slot, said flexible carrier having guide means engaging the spaced elements. The guide means may comprise rotatable means.

The inspection means may extend between the spaced elements when being moved up and down.

DESCRIPTION OF THE DRAWINGS

The invention may be performed in various ways and one specific embodiment with possible modifications will now be described by way of example with reference to the accompanying drawings, in which:

FIG. 1 is a side view of inspection apparatus;

FIG. 2 is a vertical section on the line II—II of FIG. 1 with part omitted;

FIG. 3 is a schematic plan view of part of a reactor tank region and with wall insulation omitted; and FIG. 4 is a scrap elevation of a reactor tank wall illustrating access for the apparatus.

DESCRIPTION OF A PREFERRED EMBODIMENT

The apparatus is primarily intended to provide visual inspection of the outer surface of an internal tank for liquid metal in the primary circuit of a liquid metal fast breeder nuclear reactor but the apparatus may find use in other situations requiring remote visual inspection.

A liquid metal-containing primary vessel in the form of an open-topped generally cylindrical tank 10 (only part shown) has wall 11 and a guard vessel 12 with roof 13 surrounds the tank 10 for containment of any liquid which may escape from the tank 10.

It is required periodically to inspect the outer surface 14 of the wall 11 to check for leaks. For this purpose in the present case the containment vessel roof 13 is provided with a small number of access apertures 15, each normally closed by a respective removable plug, each aperture having an upstanding tube 16 extending to an upper structure 9 and from the lower end of which extends a rigid curved guide tube 17. A horizontal guide track 18 extends completely around and slightly outside the upper end region of the wall 11 being supported on circumferentially spaced brackets 19 each secured to the wall 11 adjacent the upper end of the wall 11. The track 18 comprises two laterally spaced depending arms 20, 21 the upper ends of which are secured to the lower ends of spaced arms 19a, 19b forming part of the brackets 19 having converging portions 20a, 21a leading to radially spaced vertical portions 20b, 21b. The track 18 is typically 19 meters in diameter.

The apparatus further comprises a deployment device 22 comprising a series of rigid tubular units 23, adjacent units being connected by flexible bellows 24 so that the units can articulate relative to each other. Each unit 23 carries guide rollers 25, one on each side, for engaging the inner surfaces of portions 20b, 21b (FIG. 2) and also carries wheels 27 (two on each side) for running on the lower regions of portions 20a, 21a. The device 22 is introduced through an aperture 16 and tube 17 and can move along the track 18 to bring the leading end of the device 22 to the region of track near the next aperture 16. An umbilical cable 28 extends along and inside the device 22 and carries a camera 29 at its leading end. The camera 29 can be lowered between track portions 20b, 21b as shown chain-dotted.

Thus, the device 22 is inserted on to the track 18, the camera 29 is lowered to enable inspection of a vertical strip of the surface 14, the camera is raised, the device 22 pushed further along the track 18, the camera 29 again lowered to inspect the next adjacent vertical strip of the surface 14, and so on until the surface 14 between apertures 16 has been inspected. The device is then inserted in the next aperture 16 and this process repeated until the whole of the surface 14 has been inspected. The inner surface 30 of structure 12 can also be viewed and also the roof insulation in annular region 31, FIG. 4.

The camera 29 may be connected to a video display unit (not shown) and the cable 28 includes means for carrying a supply of coolant gas (for example argon, helium, nitrogen or carbon dioxide) to the camera 29. Light for the camera may be supplied through the umbilical cable 28.

In modified arrangements the camera is responsive to nuclear radiation, for example, from a leak in the wall 11, or to infrared radiation.

The position of the camera can be assessed from a knowledge of how many units 23 have been inserted into aperture 16 and how much cable 28 has been inserted into the device 22. The camera can be arranged to view around the track, before the camera is lowered between track portions 20b, 21b.

The apparatus is convenient and avoids a multiplicity of guide tubes around the vessel each for directing an inspection device to a selected region of the vessel outer surface and the relative simplicity of deployment improves confidence in the reliability of operation and retrieval.

Modifications are possible.

Thus the wheels 27 may in some cases be replaced by low friction sliders to form, as do the wheels, guide means for engaging the track.

The bellows 24 can be replaced by other mechanisms permitting adjacent tubes to articulate relative to each other.

The track 18 could take the form of a monorail with the deployment device 22 being guided on the monorail by suitable means.

The device could be used to inspect the outer surface of a tube and the term "vessel" is to be understood as including this. The vessel may be closed or open-topped.

Further the track 18 need not be circular as seen in plan but could take other shapes e.g. sinusoidal or alternate straight portions and curved portions. Also the surface 11 being inspected need not be circular as viewed axially.

The track 18 could be other than horizontal and could for example be attached to depend from a roof structure or be otherwise supported than from a wall 12 adjacent the wall being inspected.

The guide 17 could be in the form of a track rather than a tube. Instead of being permanently shaped into a curved deployment form as shown, the tube or guide 17 could be flexible and resilient so as to be initially curved but capable of being generally straightened to be inserted through aperture 16 and, after insertion, to regain the curved form.

The rollers 25 could be replaced by a single roller engaging both portions 20b, 21b.

In some cases the track 18 is shaped to enable the rollers 25 to be omitted.

The number of guide wheels 27 can be varied to suit requirements.

Instead of scanning the surface of the wall 11 in a series of adjacent vertical strips, the surface can be scanned in a series of adjacent horizontal strips by moving the device round the wall, and repeating this with the camera lowered a little further for each scan.

The camera could be a still camera and in any case the camera could form part of a closed circuit television system. A fiberscope could be extended through the tubes 23 to inspect the wall surface.

The camera could include lighting means to illuminate the wall 11 rather than or in addition to supplying light along the umbilical cable system.

In some cases the camera may be external to the tubes 23. The umbilical cable system may carry tools for effecting repairs, the tools being manipulable from outside the roof 13.

In general, inspection units other than or additional to the camera could be deployed by the device.

We claim:

1. Apparatus for inspecting the surface of a structure comprising a track extending around an upper region of the structure, an elongated flexible carrier engageable along its length with the track and movable lengthwise along the track, means for leading the flexible carrier insertably into engagement with the track, and retractably out of engagement with the track, at at least one position along the length of the track, and inspection means carried by the carrier for selective downward extension and upward retraction relative to the carrier and relative to the track.

2. Apparatus as claimed in claim 1 in which the inspection means is connected to a cable which extends lengthwise through the carrier and is capable of being used to push or pull the inspection device relative to the carrier.

3. Apparatus as claimed in claim 2 in which said cable is extendable through an opening in said carrier and, when so extended, depends downwardly from the carrier whereby selective extension and retraction of the cable is effective to move the inspection means downwardly and upwardly over the surface to be inspected.

4. Apparatus as claimed in claim 1 in which said flexible carrier comprises a series of units connected end-to-end with some degree of freedom whereby adjacent units can articulate relative to each other in following the contour of the track.

5. Apparatus as claimed in claim 4 in which said units are of tubular configuration and are connected end-to-end by flexible bellows couplings to form a continuous flexible tube through which said inspection means can be moved.

6. Apparatus as claimed in claim 1 in which the track includes a slot extending lengthwise thereof and through which said inspection means can be extended.

7. In combination: (a) a nuclear reactor installation including a primary vessel surrounded externally by a guard vessel and defining an annular space therebetween, and (b) apparatus as claimed in claim 1, said track extending around the top of said primary and guard vessels and said inspection means being extendable into and retractable from said annular space.

8. The combination of claim 7 in which each of said means for leading extends between a respective position along said track and a respective access aperture in roof structure disposed above said vessels.

9. The combination of claim 7 in which said flexible carrier is withdrawable in its entirety through each access aperture in said roof structure and re-insertable via a different access aperture.

10. The combination of claim 7 in which the track includes a slot extending lengthwise of the track and through which said inspection means can be extended, said slot in the track overlying said annular space.

* * * * *